(12) United States Patent
Strickon et al.

(10) Patent No.: US 7,542,754 B2
(45) Date of Patent: Jun. 2, 2009

(54) SUBSCRIBING TO CONTENT

(75) Inventors: Joshua A. Strickon, New York, NY (US); Peter S. Ng, New York, NY (US); Clayton D. Hill, Toronto (CA); Harry B. Kargman, New York, NY (US)

(73) Assignee: ACK Ventures Holdings, LLC, Westport, CT (US)

( * ) Notice: Subject to any disclaimer, the term of this patent is extended or adjusted under 35 U.S.C. 154(b) by 305 days.

(21) Appl. No.: 11/131,548

(22) Filed: May 18, 2005

(65) Prior Publication Data

US 2006/0265341 A1    Nov. 23, 2006

(51) Int. Cl.
*H04Q 7/20*    (2006.01)
(52) U.S. Cl. .................. 455/406; 455/407; 455/408
(58) Field of Classification Search .......... 455/406, 455/407, 408, 414.1; 705/35–41, 26, 29, 705/402, 403; 725/5, 6, 87, 97, 101, 104, 725/120, 126
See application file for complete search history.

(56) References Cited

U.S. PATENT DOCUMENTS

| | | | |
|---|---|---|---|
| 6,018,654 A | | 1/2000 | Valentine et al. |
| 6,058,381 A | * | 5/2000 | Nelson ................... 705/40 |
| 6,453,305 B1 | * | 9/2002 | Glassman et al. ........... 705/59 |
| 6,467,685 B1 | * | 10/2002 | Teicher ................ 235/379 |
| 7,254,557 B1 | * | 8/2007 | Gillin et al. ............. 705/40 |
| 2002/0053082 A1 | * | 5/2002 | Weaver et al. ............ 725/46 |
| 2002/0111907 A1 | * | 8/2002 | Ling ..................... 705/41 |

* cited by examiner

*Primary Examiner*—Jean A Gelin
(74) *Attorney, Agent, or Firm*—Fish & Richardson P.C.

(57) ABSTRACT

A method includes (a) receiving periodic subscription fees from subscribers of a content subscription service, (b) updating an electronically maintained account of the subscriber to reflect an additional amount of scrip corresponding to each subscription fee, and (c) enabling the subscriber to obtain items of content in amounts and at times determined arbitrarily by the subscriber in exchange for amounts of scrip in the subscriber's account.

Figure 1:
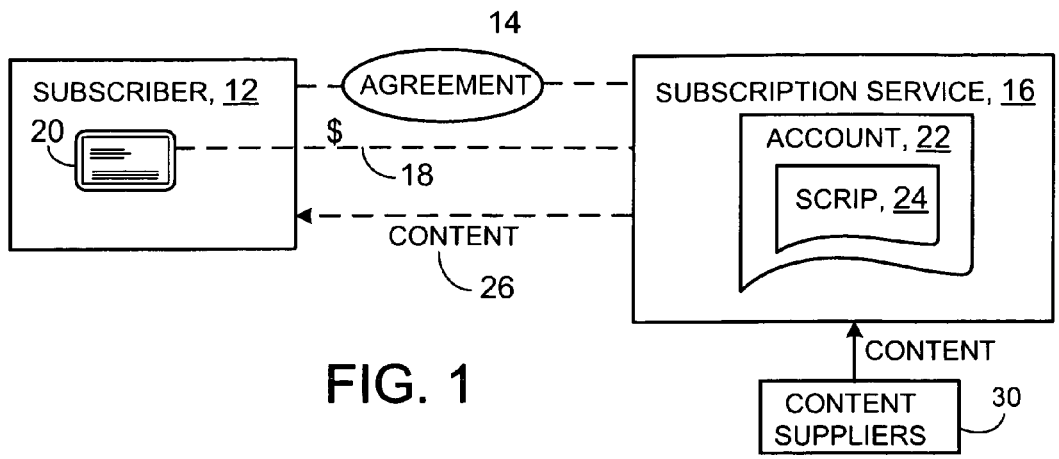

24 Claims, 2 Drawing Sheets

SUBSCRIBING TO CONTENT

BACKGROUND

This description relates to subscribing to content.

Content, such as music tracks or pictures or ring tones are distributed in various ways, for example, as free promotions, pay-as-you-go for each item of content, rental, or subscription. Sometimes content is packaged with other products such as software or monthly telephone service. The term "content" is meant to include, for example, software, text, images, videos, telephone ring tones, or any other digital items. The distribution of the content may occur in any manner such as in a tangible form, for example, on a storage medium like a CD or a flash memory, or electronically through wired or wireless communication channels such as the Internet, dial up telephone lines, cellular telephone, Bluetooth, or satellite, to name only a few.

In one specific example of a subscription model, a subscriber might be given the option of acquiring, e.g., only one item of content each week and be charged monthly for four items, whether or not four items have actually been acquired. If the subscriber wants to acquire four items in one week and none in each of the next three weeks, he is charged not only the monthly subscription price but also for the three additional items chosen in the first week, even though the monthly subscription technically covers four items. In subscription models of this kind, if the subscriber does not take a specified amount of content at a specified time, the right to take that content is no longer covered by the subscription fee.

SUMMARY

In general, in one aspect, a method includes (a) receiving periodic subscription fees from subscribers of a content subscription service, (b) updating an electronically maintained account of the subscriber to reflect an additional amount of scrip corresponding to each subscription fee, and (c) enabling the subscriber to obtain items of content in amounts and at times determined arbitrarily by the subscriber in exchange for amounts of scrip in the subscriber's account.

Implementations may include one or more of the following features. The subscription fees are expressed in terms of money. The amounts of scrip corresponding to subscription fees differs based on the timing of the subscription fees or the identity of the subscribers or both. The items of content could comprise wall paper images or ring tones or, for example, any other kind of digital content or digital media or applications. The amount of scrip in a subscriber's account not used in exchange for items of content remains undiminished as long as the subscriber remains in good standing. At least part of the scrip in the subscriber's account is extinguished in connection with a termination of the subscriber's subscription. The value of scrip exchanged for items of content could be lower than or equal to (or have any other kind of relationship to) the monetary value that would be required to buy the items of content. The value of scrip exchanged for items of content differs based on the identity or type of content. The value of scrip exchanged for items of content could differ based on the time when the exchange occurs. The subscriber is enabled to add scrip to the account by paying an additional fee. The additional fee could be paid one time or take the form of an increase in a periodic subscription fee or a combination of the two. The additional fee is in the form of an increase in the periodic subscription fees. A subscriber is enabled to supplement scrip with money in an exchange for items of content.

Other advantages and features will become apparent from the following description and from the claims.

DESCRIPTION

Figure 2:
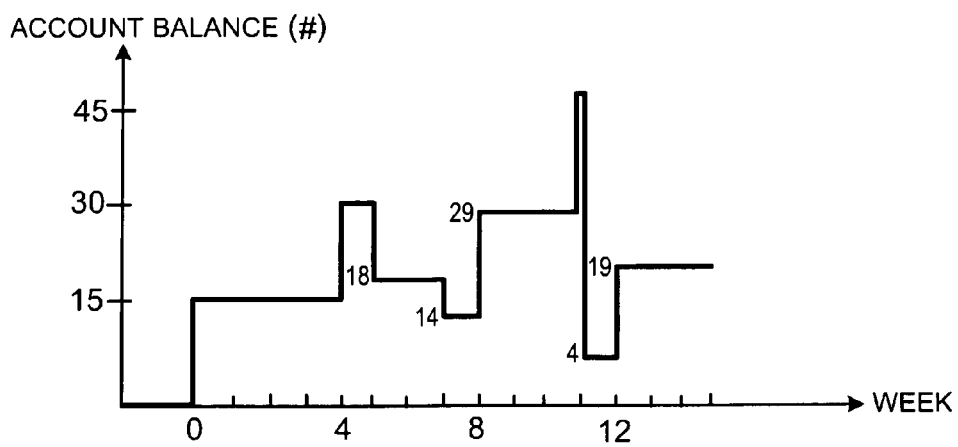
Figure 3:
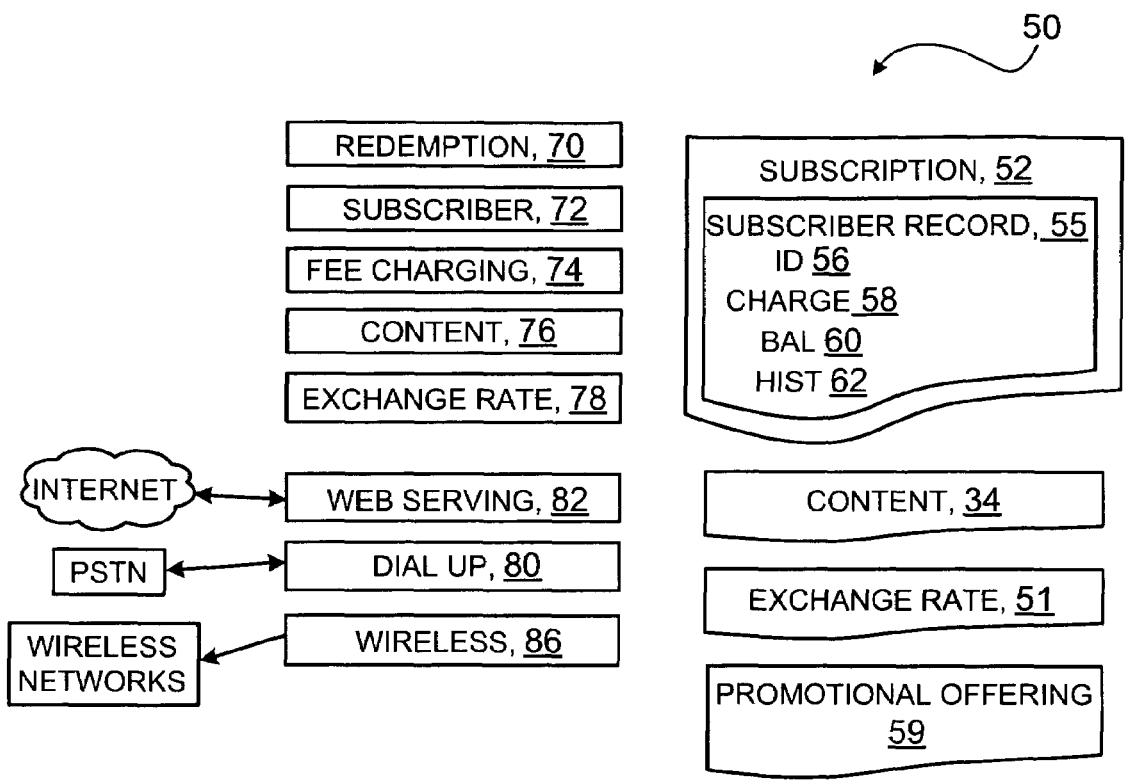

FIG. 1 is a block diagram.
FIG. 2 is a time chart.
FIG. 3 is a block diagram.

By appropriate structuring of a subscription service for content, the ability of the subscriber to choose the timing and quantity of his acquisition of content is significantly enhanced.

As shown in FIG. 1, in some examples of a flexible subscription service 10, a subscriber 12 enters into an agreement 14 with a subscription service 16 under which the subscriber agrees to be charged a subscription fee 18 periodically by the subscription service. For example, the subscriber could agree to be charged $15 a month as a subscriber. Each month, when the $15 is charged (for example, to a credit card 20 of the subscriber), an amount of scrip or currency or points that corresponds to the fee charged is credited to an account 22 maintained for the subscriber. For example, the $15 per month subscription fee may be converted to #15 in subscription currency 24 (for purposes of illustration we use the symbol # to refer to scrip or subscription currency or points). We use the terms "scrip" or "subscription currency" or "points" to refer to any representation of value in units that have no intrinsic utility of their own but rather can be exchanged for goods or services that do have intrinsic utility. Scrip may be issued and exchanged in units and in denominations that are multiples of units.

As long as the subscriber continues as a subscriber in good standing, subscription currency continues to accumulate each month. The subscriber is free to use the available subscription currency to acquire items of content 26 offered by the subscription service in amounts and at times chosen by the subscriber. At a given time, the amount of subscription currency in the subscriber's account is the accumulated amount attributable to conversion of periodic subscription fees, minus the amounts of currency used to acquire items of content from the subscription service. The content to be provided to the subscribers by the subscription service is acquired from suppliers 30 of content.

The subscriber is not bound to buy any particular amount of content items (or any at all) in any particular period, or to buy content periodically. The remaining purchasing power of the subscription amounts is maintained over time, from period to period, regardless of whether content items are taken or not.

The subscription currency never expires as long as the subscriber maintains his subscription in good standing. When the subscriber terminates his subscription, either voluntarily or by failure to pay subscription charges, the balance of subscription currency in his account is completely extinguished. As time passes, the subscriber has a strong incentive to continue his subscription or to spend all of his subscription currency if he wishes to terminate.

If the amount of subscription currency available in a subscriber's account is less than an amount required to acquire one or more items of content at a given time or times, the subscriber is offered a choice to change the level of his periodic subscription fee, make a one-time purchase of subscription currency, or provide the shortfall in real money.

In some specific examples, users of cell phones might become subscribers to a subscription service that makes digital content or media or applications (for example, ring tones and wall paper images) available for use on their cell phones. The subscribers could agree to pay, say, $10 per month as a subscription fee. The $10 could be converted to #15 in subscription currency and added to the subscribers' accounts each month. Each subscriber could then buy one or more ring tones and wall paper images at times and in quantities decided by the subscribers.

For example, as shown in FIG. 2, at week zero, the first monthly fee is collected and converted to scrip (in this illustration we assume each month has exactly four weeks). The subscriber takes no content and spends no scrip during the first four weeks. At week four, the second monthly fee is collected. In the fifth week, after accumulating #30 in subscription currency in his account, the subscriber buys four ring tones at #3 each. Two weeks later, in week seven, the subscriber could buy two wall paper images at #2 each. After another month accumulation of scrip, in week eleven, the subscriber might wish to buy ten more ring tones at #4 each, which would overrun the existing balance (then #29) by #11. The subscriber could decide to make a one-time purchase of #15 subscription currency to cover the shortfall. The subscription service could allow the subscriber to make that purchase of scrip at an exchange rate of $1/#2 rather than the normal rate of $1/#1.5. Once the balance has been increased, the subscribers takes the ten ring tones.

In addition to giving the subscriber flexibility in the timing of content acquisitions, the subscription service provides a wide range of opportunities for the subscription service or suppliers of content to offer promotions and incentives for desired behavior on the part of the subscribers.

For example, the exchange rate of $s to #s at the time of purchase (either upon the automatic periodic subscription charge or in one-shot transactions) could be changed at various times and for various purposes. The rate could be improved for particular occasions, for example, to attract new subscribers, or to "reward" subscribers who are active in their use of the service, or who have accumulated more than a pre-defined number of #s in an account, or who have remained subscribers for a long period of time, or who have enticed other new subscribers to join the service. Subscribers could be categorized demographically by age, or location, or sex, or any of a wide variety of other factors, and the exchange rate could be different for different classes. Joint promotions could be arranged with suppliers of other products in which special rates apply to acquisition of #s for purchasers of the other products. In general, all of the kinds of marketing promotions that are used in the normal marketplace for goods and services can be applied or modified for use with the subscription service.

Similarly, the exchange rate of #s for items of content at the time of acquisition could be changed at various times for various purposes, included times and purposes similar to those mentioned above for purchase rate changes. In addition, the exchange rate could be changed based on the characteristics of the content. Content could be classified by type (popular music ring tones versus classical music ring tones, for example) or by longevity (for example, ring tones might be more expensive when newly offered and less expensive as time passes).

As shown in FIG. 3, subscription fees, subscription data, and redemption transactions, among other things, are managed by a subscription server 50 on which a subscriber database 52, a content database 54, an exchange rate database 51, and a promotional offering database 59 are maintained.

The content database 54 includes the items of content and information about them including title, age, source, number of redemptions, classification information useful in managing promotional programs, and other information useful in acquiring, classifying, managing, delivering, and housekeeping of items of content.

The subscriber database 52 includes a record 55 for each of the subscribers. A subscriber record 55 may contain, for example, subscriber identification information 56 (name, address, telephone numbers, other demographic information, personal preference information), fee charging information (credit card numbers or debit account numbers) 58, current and historical subscription scrip balances 60, redemption transaction histories 62, and a variety of other information 64 that may be useful in initiating, terminating, analyzing, and managing subscriber accounts.

The exchange rate database 51 includes information about historical and current exchange rates for $s to #s and #s to content items that apply to purchases and redemptions of #s and content items and information about the conditions under which they apply.

The promotional offering database 52 includes information about historical and current promotional offers that relate to purchase and redemption of #s.

Software running on the subscription server includes, among others the following processes.

A redemption process 70 uses information in the subscription database 52, the content database 54, the exchange rate database 51, and the promotional offering database 59, to manage the process of redeeming #s for content items in compliance with applicable exchange rates. The redemption process 70 also updates records in the subscription database 52 to record redemption transactions.

A subscriber management process 72 manages the creation of new subscriber accounts, the termination of accounts, and the updating of accounts based on information derived from subscribers and from the redemption process 70 and the fee charging process 74.

A fee charging process 74 uses information in the subscription database, the exchange rate database 59 to charge the financial accounts of subscribers periodically for subscription fees in accordance with applicable exchange rates.

A content acquisition management process 76 maintains the content database.

An exchange rate management process 78 enables a representative of the subscription service to maintain current records about exchange rates and promotional offerings.

Interaction with users of the server is managed by a web serving process 82 through the internet 83, a dial-up process 84 through the public switched telephone network 85, and wireless communication process 86 through cellular, Bluetooth, and other wireless communication channels.

In some examples of how the system is used, a person can start an account by registering on-line through a computer and web browser or by a telephone call to a service representative. The person gives personal information such as name, address, email address, telephone number, and billing information (such as a credit card number and expiration date). An identification of the account, for example, an account number (and a personal identification number) can be assigned by the server and selected by the subscriber for use in acquiring content in exchange for scrip. The subscriber also selects an amount to be charged periodically to the credit card for conversion to scrip.

Also using a web browser or a telephone call, the subscriber may check at any time to learn the status of his account (including the history of transactions and the current balance of scrip) and can update his account information, change the amount of the periodic subscription fee, buy additional scrip, apply money to the purchase of content, terminate the subscription, and exchange scrip for content. Information about the current balance of scrip (and other account information) can also be pushed out to the subscribers from the server on a regular basis through automated telephone calls, email messages, or telephone messages.

To learn about content that is available to subscribers for exchange, the subscribers can initiate queries through their telephones, through browsers, or by telephone calls to the service. In addition, the service can make the subscribers aware of content by pushing out to the subscribers (by email, text messages, and telephone calls) lists, images, sounds, and other information about items that are available together with indications of the numbers of scrip units needed to acquire them.

To complete an exchange of scrip for content, the subscriber identifies for the service the item or items of content that he wishes to acquire and provides a unique identifier. The unique identifier could be an account number and PIN, a user name and password, or any other user-specific unique identifier that can be automatically detected in connection with the content selection process. Then the content is provided (for example) electronically through the internet, by telephone transmission, wirelessly, or on tangible media such as a CD, DVD, flash memory, paper, or any other form on which it can be expressed.

Although many of the steps of registering as a subscriber, managing a subscriber account, charging money to the account, becoming aware of available content items, exchanging scrip for content, and other actions have been described as being done largely electronically, many if not all of the steps can be done by hand, in person, or live on the phone. For example, most of the steps could be done either live in a store or other location or by telephone.

Other implementations of the subscription service are also within the scope of the claims.

For example, although in the subscription service described above, information about the subscriber and his transactions is maintained centrally and under the control of the subscription service, the service could also be operated in such a way that the subscriber and his transactions are anonymous. Many of the steps can be performed without the use of a server or a credit card and without the need for the subscriber to disclose any person or financial information. For example, an account could be created anonymously and subscription fees could be paid in cash at a store. A scrip card could be used to hold information about the number of units of scrip.

The invention claimed is:

1. A method comprising
   maintaining an electronic account for a subscriber of a content subscription service, the electronic account indicating at any time a balance of scrip associated with respect to a subscription of the subscriber, the subscription having successive time intervals,
   updating the balance by adding an amount of scrip corresponding to a subscription fee received from the subscriber with respect to each of the successive time intervals of the subscription,
   enabling the subscriber to use scrip belonging to the balance to acquire items of content from a remote source, each item of content having an associated value in units of scrip,
   reducing the balance by the amount of scrip used to acquire the items of content, and
   carrying forward at least some of the scrip, if any, belonging to the balance from each time interval of the subscription to the next time interval of the subscription.

2. The method of claim 1 in which the subscription fee is expressed in terms of money.

3. The method of claim 1 in which the amount of scrip corresponding to the subscription fee differs based on the timing of the subscription fee or the identity of the subscriber or both.

4. The method of claim 1 in which the items of content comprise digital content, media, or applications or combinations of them.

5. The method of claim 1 in which the amount of scrip belonging to the balance not used in exchange for items of content remains undiminished as long as the subscriber remains in good standing.

6. The method of claim 1 also including extinguishing at least part of the scrip in the subscriber's account in connection with a termination of the subscriber's subscription.

7. The method of claim 1 in which the amount of scrip exchanged for items of content is equal to or lower than the monetary value that would be required to buy the items of content.

8. The method of claim 1 in which the amount of scrip exchanged for items of content differs based on the identity or type of content.

9. The method of claim 1 in which the amount of scrip exchanged for items of content differs based on the time when the exchange occurs.

10. The method of claim 1 also including enabling the subscriber to add scrip to the balance by paying an additional fee.

11. The method of claim 10 in which the additional fee is paid one time.

12. The method of claim 10 in which the additional fee is in the form of an increase in the subscription fee.

13. The method of claim 1 also including enabling a subscriber to supplement scrip with money in an exchange for items of content.

14. The method of claim 1 in which the items of content comprise wall paper images or ring tones.

15. The method of claim 1 also including enabling the subscriber to add scrip to the balance upon activities of a subscriber other than monetary payment.

16. The method of claim 1 also including adding scrip to the balance based upon an action of the content subscription service.

17. The method of claim 1 in which the amount of scrip corresponding to the subscription fee received from the subscriber is based upon a promotional exchange rate.

18. The method of claim 1 in which the items of content comprise telephonic tones.

19. The method of claim 18 in which the telephonic tones are utilized in connection with call processing.

20. The method of claim 1 in which the items of content comprise goods.

21. The method of claim 1 in which the items of content comprise text, images or both.

22. The method of claim 1 in which the items of content are distributed in tangible form.

23. The method of claim 1 in which the items of content are distributed electronically.

24. A method comprising:
   at a server, maintaining a content subscription service enabling the acquisition of items of content by a subscriber by:
      maintaining information about the items of content available to a subscriber;

maintaining a balance of scrip associated with a subscription of a subscriber, the subscription having successive time intervals;

updating the balance by a determined amount of scrip used to acquire the items of content; and enabling the subscriber access to the server to use scrip belonging to the balance to acquire the items of content during a time interval of the subscription, each item of content having an associated value in units of scrip, and at least some of the scrip, if any, belonging to the balance at the end of that time interval being carried over to the next time interval of the subscription.

* * * * *